United States Patent
Rhody

[11] 3,722,911
[45] Mar. 27, 1973

[54] TIE DOWN ANCHOR
[76] Inventor: Howard A. Rhody, 9312 South Forrey, Grand Blanc, Mich. 48439
[22] Filed: Oct. 29, 1971
[21] Appl. No.: 193,781

[52] U.S. Cl. .............................................. 280/179 R
[51] Int. Cl. ............................................... B60p 7/00
[58] Field of Search ....... 280/179 R, 179 A; 248/308, 248/223, 224

[56] References Cited

UNITED STATES PATENTS

| | | | |
|---|---|---|---|
| 3,332,119 | 7/1967 | Sherwood | 280/179 A |
| 3,412,693 | 11/1968 | Lewis | 280/179 R |
| 3,377,039 | 4/1968 | Hayes | 280/179 R |

*Primary Examiner*—Leo Friaglia
*Assistant Examiner*—Robert R. Song
*Attorney*—Andrew R. Basile

[57] ABSTRACT

A tie down anchor mounted on a vehicle and adapted to facilitate the lashing down of a load carried by the vehicle. The tie down anchor has a support plate with spacer means disposed between the support plate and the vehicle to provide a clearance space therein-between when the support plate is fastened to the vehicle. The front face of the support plate has a plurality of retaining arms extending outwardly in a spider-like configuration and within which is carried an anchor movable between a first outwardly projecting position and a second lowered position wherein the anchor is disposed behind the retaining arms in a general parallel relationship with the support plate. A channel-shaped cover has legs with inwardly bent end flanges that are adapted to be disposed within the clearance space and slidably engaged to the back side of the support plate when the cover member is slid down over the front face of the support plate. The retaining arms are joined at their extended ends to define a base portion that is spaced from the support plate a sufficient distance to slidably engage the inner face of the cover so as to exert a slight outward force thereagainst and urge the bent end flanges of the cover against the back side of the support plate and thereby secure the cover from accidental removal from the support plate.

10 Claims, 5 Drawing Figures

Patented March 27, 1973

3,722,911

INVENTOR.
HOWARD A. RHODY
BY
Hauke Gifford & Patalidis
Attorneys

TIE DOWN ANCHOR

BACKGROUND OF THE INVENTION

I. Field of the Invention

The present invention relates to tie down anchors, and, more particularly to a tie down anchor for securing a load carried by automobiles and similar vehicles.

II. Description of the Prior Art

It has become quite customary for many individuals to transport goods on racks or similar containers mounted to the top of an automobile or similar vehicles and it is important to insure that the load is secured in place to avoid damage to the load or to the carrier in the event that the load should fall from the carrier while the same is in motion. It has been a customary practice to secure such loads to the tops of automobiles by means of straps or ropes extended between the load and the automobile bumpers. Such a manner of tying down the load has not been satisfactory in all circumstances, and, particularly, since the sharp corners of the bumpers tend to cut into the rope or strap, there is a substantial danger of the strap or rope breaking while the automobile is in motion.

Although tie down anchors are well known, they are not adaptable for use on automobiles as they tend to detract from the appearance of the automobile. It would therefore be highly desirable to provide a tie down anchor with means for concealing the anchor in a manner which does not take away from the overall appearance of the automobile.

SUMMARY OF THE INVENTION

The present invention, which will be described subsequently in greater detail, comprises a tie down anchor particularly adapted for mounting on passenger vehicles and the like comprising a support plate having means mounting the anchor and means for mounting the support plate to the vehicle in such a manner that a predetermined clearance space is provided between the vehicle and the back side of the support plate, and into which is slidably disposed a portion of a cover adapted to conceal the anchor when the same is not in use. The cover cooperates with the anchor mounting means of the support plate in such a manner as to exert a force against the cover to prevent its removal from its support plate when the vehicle is in motion. The cover is provided with an exterior coating complementary to that portion of the vehicle on which the tie down anchor is mounted.

It is therefore an object of the present invention to provide a new and improved tie down anchor particularly adapted for use on passenger vehicles.

It is also an object of the present invention to provide a tie down anchor which is durable and rugged, which may be manufactured at a relatively low cost, quickly and inexpensively installed, and which does not take away from the overall appearance of the vehicle.

Other objects, advantages, and application of the present invention will become apparent to those skilled in the art of tie down anchors when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which.

DESCRIPTION OF THE PREFERRED EMBODIMENT

Figure 1:
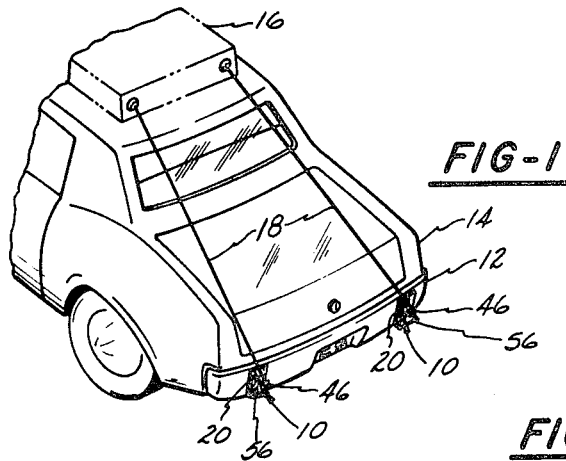
FIG. 1 is a fragmentary perspective view of an automobile having several tie down anchors constructed in accordance with the principles of the present invention.

Referring now to the drawing and, in particular, to FIG. 1 wherein there is illustrated a pair of tie down anchors 10 constructed in accordance with the principles of the present invention and mounted to the rear bumper 12 of an automobile 14 for lashing a load 16 to the top of the automobile 14 by means of fastening lines 18 secured to the anchors 10 and the load 16.

Figure 3:
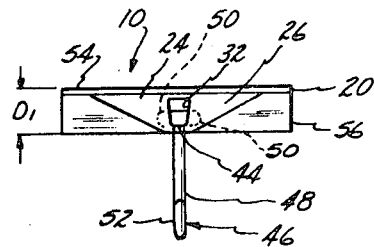
FIG. 3 is a fragmentary, top elevational view of tie down anchor as seen from line 3—3 of FIG. 2.

Tie down anchor 10 comprises a support plate 20, the front face of which protrudes outwardly in a spider-like configuration 22. The spider-like configuration 22 is formed by a plurality of outwardly inclined retaining arms 24, 26, 28 and 30 between which are respectively formed openings 32, 34, 36 and 38. The extended ends of the retaining arms are integrally joined to form a base section 40. The lower opening 36 terminates in a vertically disposed elongated slot 42 having parallel side walls, and which is separated from the upper opening 32 by a cross member 44. The spider-like configuration 22 is adapted to support an anchor 46 when it is desired to lash the load 16 down as hereinbefore described. As will be explained hereinafter, the distance $D_1$ (FIGS. 3 and 5) that the base 40 and the cross member 44 project outwardly from the back side 54 of the support plate 20 is of particular importance.

Figure 4:
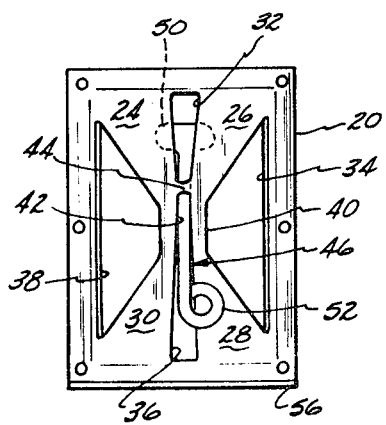
FIG. 4 is a fragmentary, front elevational view of the tie down anchor illustrated in FIG. 2 with the tie down anchor in a stored position.

The anchor 46 comprises a non-circular shaft portion 48, that is, the shaft portion 48 preferably has a rectangular cross section complementary to the slot 42. The shaft portion 48 has a semi-spherically shaped ball 50 at the inner end and a tie-on hook 52 at its outer end. As can best be seen in FIGS. 2 and 3, the shaft 48 and the hook 52 of the anchor 46 are adapted to project through the slot 42 when the anchor 46 is in use with the complementarily shaped shaft portion 48, mating with the slot 42 to prevent rotational movement of the anchor 46 so that the hook projects outwardly as illustrated, while the cross member 44 limits the upward movement of the anchor 46. When the anchor 46 is not in use, the same is displaced downwardly from the slot 42 into the larger lower opening 36 and the entire anchor 46 is placed in an upright position for storage, as illustrated in FIG. 4.

The support plate 20 has a lower right angle flange portion 56 which projects outwardly from the front face of the support face 20 a distance slightly greater than the distance $D_1$ for a purpose which will be likewise described hereinafter.

Figure 2:
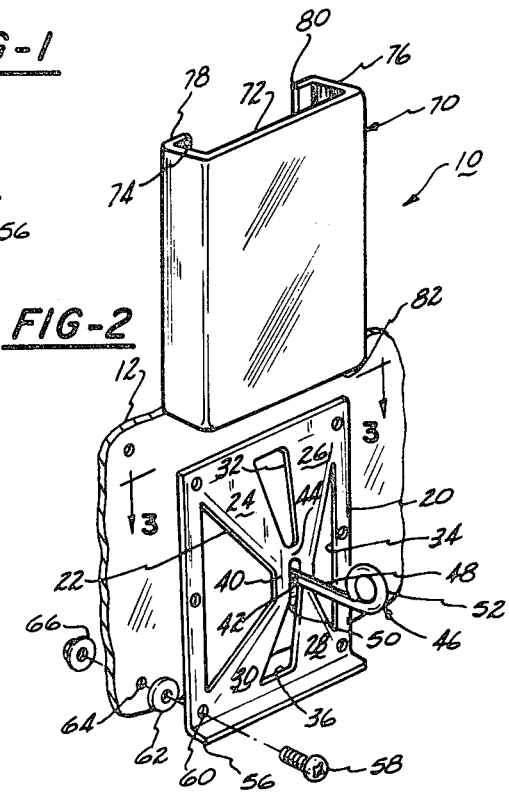
FIG. 2 is an exploded perspective view of one of the tie down anchors illustrated in FIG. 1.

The support plate 20 is mounted to the vehicle bumper 12 with the anchor 46 disposed between the retaining arms of the spider-like configuration 22, as illustrated in FIG. 2, by means of a plurality of fastening members, such as screws 58 (FIGS. 2 and 5), that extend through apertures 60 in the support plate 20, through a spacer 62, such as a resilient O-ring disposed between the back side 54 of the back support plate 20 and the front surface of the bumper 12, through apertures 64 in the bumper 12 and into a threaded engagement with lock nuts 66. It should be noted that the screws 58 may be of the self-threading type which directly engage the bumper 12 and thus would not require the need of the lock nut 66.

The provision of the resilient O-rings 62 surrounding the shank portion of each of the screws 58 provides a clearance space 68 between the back side 54 of the support plate and the face of the bumper 12 along the full length of the support plate 20.

Figure 5:
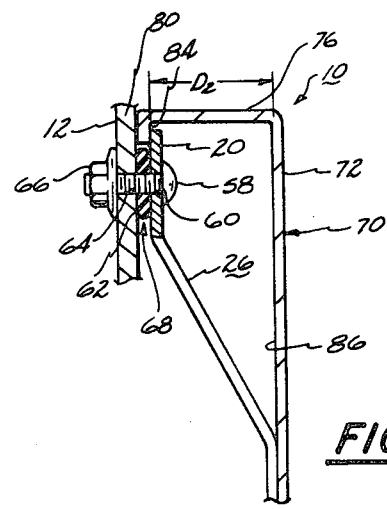
FIG. 5 is a fragmentary, cross-sectional view through one of the retaining screws of the tie down anchor.

Still referring to FIGS. 2 and 5, the tie down anchor 10 further comprises a cover 70 having a channel or U-shaped cross-sectional configuration, including a base 72 with rearwardly projecting opposing side legs 74 and 76 having bent end flanges 78 and 80, respectively. The cover 70, which is adapted to be slid over the support base 20, as will be described hereinafter, has an exterior finish which is complementary to or matches the finish of that portion of the automobile on which it is mounted. In the embodiment illustrated, the cover 70 would be chrome plated to match the chrome plating of the bumper 12.

When the tie down anchor 10 is not being employed to lash down the load 16, the anchor 46 is removed from the slot 42 and placed in a vertical position behind the retaining arm as illustrated in FIG. 4. The cover 70 is then placed vertically above the support plate 20 with the inwardly bent end flanges 78 and 80 being received in the clearance space 68 between the back side 54 of the support plate 20 and the front face of the bumper 12 and slid down over the front face of the support plate 20 until the forward bottom edge 82 of the base portion 72 abuts the top of the outwardly projecting flange 56 to limit further downward movement of the cover 70 with respect to the support plate 20.

As can best be seen in FIG. 5, the distance $D_2$ that is, the distance between the inside surface 84 of the bent end flanges 78 and 80 to the inside surface 86 of the base 72 is slightly less than the distance $D_1$, that is, the difference from the back side 54 of the support plate 20 to the front face of the base 40 and cross member 44, such that there is a slight interference fit when the cover 70 is placed in position as shown in FIG. 5 to enclose the base 20 and anchor 46. Due to the resilience of the retaining arms of the spider-like configuration 22, the same will be slightly inwardly compressed and will exert an outwardly directed force against the cover 70 to bias the same outwardly and insure a tight fit of the bent end flanges 78 and 80 against the back side 54 of the support plate 20. This snug fit between the support plate 20 and the bent end flanges 78 and 80 will minimize the possibility of an accidental removal of the cover 70 from the support plate 20 when the automobile is in motion.

It can thus be seen that the present invention provides a new and improved tie down anchor particularly adapted for use on automobile bumpers which is durable and rugged in its construction, which may be manufactured at a relatively low cost, and quickly and inexpensively installed on the automobile.

It can also be seen that the present invention has provided a tie down anchor which will not detract from the overall appearance of the automobile when the same is not being employed to lash down a load carried by the automobile.

Although only one embodiment of the present invention has been disclosed, it is to be understood by those skilled in the art that other forms and modifications may be made without departing from the spirit of the invention or the scope of the appended claims.

What is claimed is as follows:

1. A tie down anchor in combination with a vehicle having a bumper comprising:
   a support plate;
   fastening means extending through said support plate into said bumper for attaching said support plate to said bumper;
   spacer means carried by said fastening means between said support plate and said bumper to provide a predetermined clearance space between said bumper and the back side of said support plate;
   an anchor;
   means movably securing said anchor to the front side of said support plate such that said anchor is movable between a first position wherein said anchor projects outwardly from said front side of said support plate and a second position wherein said anchor is disposed behind said securing means;
   a cover having bent end flanges adapted to be received in said clearance space and slidably engage the back side of said support plate as said cover is slid down in front of said support plate when said anchor is in said second position; and
   a stop means carried by said support plate to limit the downward movement of said cover.

2. The tie down anchor defined in claim 1 wherein the exposed surface of said cover has an external finish complementary to the support plate carrying portion of said bumper.

3. The tie down anchor defined in claim 1 wherein the front side of said support plate has a plurality of outwardly extending retaining arms joined to one another at their extended ends and defining an aperture through which said anchor projects when said anchor is in said first position, said joined ends of said retaining arms having an elongated opening extending downwardly from said aperture to permit said anchor to be displaced behind said retaining arms when in said second position.

4. The tie down anchor defined in claim 3 wherein said anchor comprises an elongated non-circular shaft portion having a rounded end and a hook-shaped end, said rounded end being disposed behind said retaining arm, and said aperture having a configuration conforming to the configuration of said shaft such that said shaft is non-rotatable when disposed in said aperture.

5. The tie down anchor defined in claim 1 wherein said plate has a lower flange portion projecting outwardly from said support plate a sufficient distance to engage the bottom of said cover when said cover is carried by said support plate so as to limit the downward movement of said cover.

6. The tie down anchor defined in claim 1 wherein said support plate has a plurality of strategically placed bores through which said fastening means extend for attachment to said bumper, said fastening means comprising a plurality of screws extending through said bores and into threaded engagement with said bumper, said spacers comprising resilient O-rings encompassing each of said screws of such a thickness and resiliency to insure that said back side of said support plate is spaced from said bumper a sufficient amount to define said predetermined clearance space.

7. The tie down anchor defined in claim 1 wherein said cover is of a channel configuration having a front face and parallel side walls with curved end flanges paralleling said front face, said means securing said anchor to said support plate extending outwardly from said support plate a sufficient distance to interfere with the inner side of said cover as said cover is lowered into position on said support plate to exert an outwardly directed force on said cover and urge said flanges against the back side of said support plate.

8. The tie down anchor defined in claim 3 wherein said cover is of a channel configuration having a front face and parallel side walls with curved end flanges paralleling said front face, said means securing said anchor to said support plate extending outwardly from said support plate a sufficient distance to interfere with the inner side of said cover as said cover is lowered into position on said support plate to exert an outwardly directed force on said cover and urge said flanges against the back side of said support plate.

9. The tie down anchor defined in claim 8 wherein said plate has a lower flange portion projecting outwardly from said support plate a sufficient distance to engage the bottom of said cover when said cover is carried by said support plate so as to limit the downward movement of said cover.

10. The tie down anchor defined in claim 9 wherein the exposed surface of said cover has an external finish complementary to the support plate carrying portion of said bumper.

* * * * *